(12) United States Patent
Juarez Marroquin et al.

(10) Patent No.: US 11,054,584 B2
(45) Date of Patent: Jul. 6, 2021

(54) MODE COUPLING CONNECTOR SYSTEMS FOR MULTIMODE MULTICORE OPTICAL FIBERS

(71) Applicant: Corning Research & Development Corporation, Corning, NY (US)

(72) Inventors: Adrian Alejando Juarez Marroquin, Wellsboro, PA (US); Gordon Mueller-Schlomka, Berlin (DE)

(73) Assignee: Corning Research & Development Corporation, Corning, NY (US)

( * ) Notice: Subject to any disclaimer, the term of this patent is extended or adjusted under 35 U.S.C. 154(b) by 67 days.

(21) Appl. No.: 16/686,882

(22) Filed: Nov. 18, 2019

(65) Prior Publication Data
US 2021/0149119 A1    May 20, 2021

(51) Int. Cl.
  *G02B 6/38*   (2006.01)
  *G02B 6/27*   (2006.01)
  *G02B 6/26*   (2006.01)

(52) U.S. Cl.
  CPC .......... *G02B 6/3825* (2013.01); *G02B 6/264* (2013.01); *G02B 6/2726* (2013.01); *G02B 6/3851* (2013.01)

(58) Field of Classification Search
  None
  See application file for complete search history.

(56) References Cited

U.S. PATENT DOCUMENTS

| | | |
|---|---|---|
| 4,229,067 A | 10/1980 | Love |
| 4,676,594 A | 6/1987 | Presby |
| 4,974,930 A | 12/1990 | Blyler et al. |
| 5,619,610 A * | 4/1997 | King ............... G02B 6/3818 385/139 |
| 5,892,866 A | 4/1999 | Bristow et al. |
| 6,895,146 B1 | 5/2005 | Wey et al. |
| 7,945,130 B2 | 5/2011 | Yan et al. |
| 9,400,357 B2 * | 7/2016 | Kato ................. G02B 6/387 |

OTHER PUBLICATIONS

Arik et al; "Effect of Mode Coupling on Signal Processing Complexity in Mode-Division Multiplexing"; Journal of Lightwave Technology; vol. 31, No. 3, 2013; pp. 1-10.
(Continued)

*Primary Examiner* — Jerry Rahll
(74) *Attorney, Agent, or Firm* — Michael E. Carroll, Jr.

(57) ABSTRACT

A mode coupling connector system that includes a first and second fiber connector each coupled to a coupler housing. The first and second fiber connectors are positioned in first and second receiving cavities of the coupler housing, respectively. The first and second fiber connector each have a ferrule with a fiber receiving hole extending from an outer end to an inner end of the ferrule. The fiber receiving hole of the first and second fiber connector are in axial alignment. The mode coupling connector system further includes a mode coupling plate having a phase mask array of a plurality of phase masks. The mode coupling plate is positioned in a plate receiving hole of the coupler housing between the first and second receiving cavity and at least two phase masks of the phase mask array are circumscribed by the fiber receiving hole of both the first and second fiber connector.

24 Claims, 6 Drawing Sheets

(56) References Cited

OTHER PUBLICATIONS

Blau et al; "Broadband Mode-Group Mixing Via Spatial Phase Masks Printed on Fiber Facet"; Advanced Photonics Confress, NeW3B.3, 2017; 3 Pages.
Blau et al; "Mode-Group Mixing Device Via Complex Phase Masks Printed on Fiber Tip"; IEEE, (2017) 2 Pages.
Ikeda et al; "Multimode Optical Fibers: Steady State Mode Exciter"; Applied Optics, vol. 15, No. 9; (1976) pp. 2116-2120.
Juarez et al; "Modeling of Mode Coupling in Multimode Fibers With Respect to Bandwidth and Loss"; Journal of Lightwave Technology, vol. 32, No. 8, 2014; pp. 1549-1558.
Richardson et al; "Space Division Multiplexing in Optical Fibers"; Nature Photonics 7, 354 362, 2013.
Saito et al; "Multi-Core Fiber Connector Using V-Groove Ferrule"; Optical Fiber Technology, 23, (2015) pp. 24-29.
Sakamoto et al; "Differential Mode Delay Managed Transmission Line for WDM-MIMO System Using Multi-Step Index Fiber"; Journal of Lightwave Technology, vol. 30, No. 17, 2012; pp. 2783-2787.

\* cited by examiner

MODE COUPLING CONNECTOR SYSTEMS FOR MULTIMODE MULTICORE OPTICAL FIBERS

BACKGROUND

Field

The present specification generally relates to optical connector systems. More specifically, the present disclosure relates to mode coupling connector systems that include a mode coupling plate configured to induce mode coupling between multimode multicore optical fibers.

Technical Background

Mode division multiplexing over multimode multicore optical fiber using a multiple-input multiple-output (MIMO) digital signaling processing unit has been investigated as a potential solution to overcome the capacity crunch predicted for single mode fiber transmission. In particular, the spectral efficiency of an optical communication system may be enhanced using a mode division multiplexing over multimode multicore optical fiber with a MIMO digital signal processing unit because multiple signal streams can be transmitted simultaneously over multimode fiber and recovered individually by receivers. However, one challenge presented by mode division multiplexing using a MIMO digital signal-processing unit is that the computation needed to recover the signals at the receiver end becomes increasingly complex when the differential mode delay of the propagation modes increases. In particular, propagation modes within a multimode optical fiber) tend to intermix, requiring the reception of all the mixed channels followed by signal processing over the spatial channels to unravel the original information. Furthermore, propagation modes also travel at different velocities and thus the mixed signals reaching the receiver contain information that is temporally spread, which increases the computational requirements to unravel the information. The complex computational requirements caused by increased differential mode delay limits the transmission length available when implementing mode division multiplexing over multimode multicore optical fiber using a MIMO digital signaling processing unit.

Differential mode delay may be minimized by increasing the mode coupling between the propagation modes of the optical transmission. For example, mode coupling may be increased by printing a spatial phase mask on the fiber facets of the multimode optical fibers used in a transmission system. The spatial phase mask induces mode mixing while maintaining low losses. However, directly printing spatial phase masks onto fiber facets is a complicated process that must be performed during the manufacturing of each multicore optical fiber. Accordingly, improved methods and systems for mode coupling multimode multicore optical fibers in long-range multimode transmission systems are desired.

SUMMARY

According to an embodiment of the present disclosure, a mode coupling connector system includes a first fiber connector comprising a first ferrule having a first fiber receiving portion and a second fiber connector comprising a second ferrule having a second fiber receiving hole, and the first and second fiber connector are coupled to a coupler housing. The first fiber connector is positioned in a first receiving cavity of the coupler housing and the second fiber connector is positioned in a second receiving cavity of the coupler housing. The first fiber receiving hole extends from an outer end of the first ferrule to an inner end of the first ferrule and the second fiber receiving hole extends from an outer end of the second ferrule to an inner end of the second ferrule. The first fiber receiving hole of the first fiber connector and the second fiber receiving hole of the second fiber connector are in axial alignment. Furthermore, the mode coupling connector system includes a mode coupling plate having a phase mask array of a plurality of phase masks. The mode coupling plate is positioned in a plate receiving hole of the coupler housing between the first receiving cavity and the second receiving cavity and at least two phase masks of the phase mask array are circumscribed by the fiber receiving hole of both the first fiber connector and the second fiber connector.

According to another embodiment of the present disclosure, a mode coupling connector system includes a first fiber connector and a second fiber connector each coupled to a coupler housing, where the first fiber connector is positioned in a first receiving cavity of the coupler housing, the second fiber connector is positioned in a second receiving cavity of the coupler housing, and the first fiber connector and the second fiber connector each include a ferrule. The mode coupling connector system also includes a first multimode multicore optical fiber positioned in the ferrule of the first fiber connector and a second multimode multicore optical fiber positioned in the ferrule of the second fiber connector such that an end facet of the first multimode multicore optical fiber is in axial alignment with an end facet of the second multimode multicore optical fiber. Furthermore, the mode coupling connector system includes a mode coupling plate having a phase mask array of a plurality of phase masks. The mode coupling plate is positioned in a plate receiving hole of the coupler housing between the first receiving cavity and the second receiving cavity and at least two phase masks of the phase mask array are positioned between and aligned with individual cores of the first multimode multicore optical fiber and the second multimode multicore optical fiber.

In yet another embodiments, a mode coupling connector system includes a coupler housing having a first receiving cavity and a second receiving cavity, a mode coupling plate positioned in a plate receiving hole of the coupler housing between the first receiving cavity and the second receiving cavity, where the mode coupling plate has a key notch and a phase mask array with a plurality of phase masks, and a key positioned in a housing key hole of the coupler housing and engaged with the key notch of the mode coupling plate.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
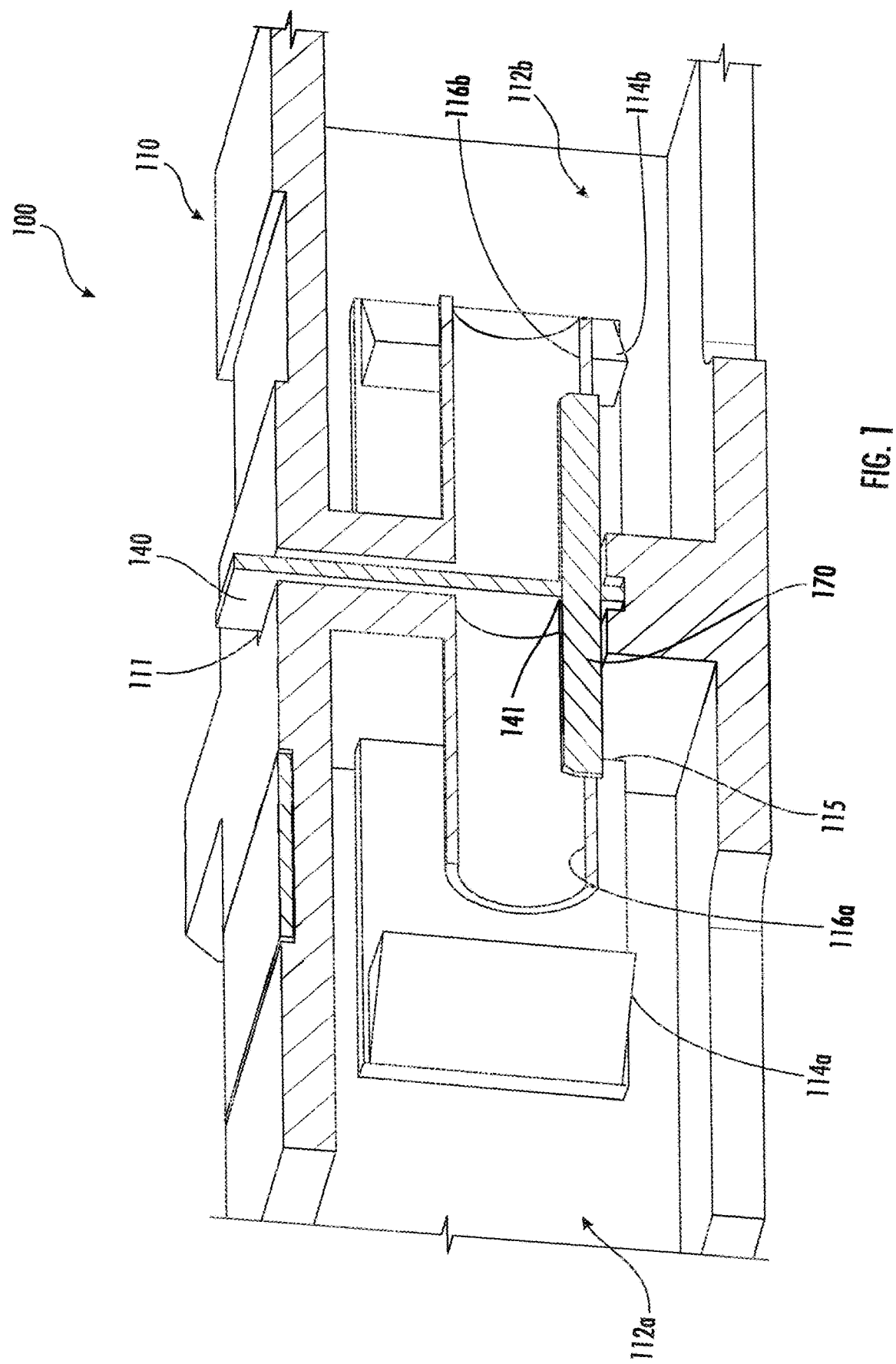
FIG. 1 schematically depicts a coupler housing of an example mode coupling connector system, according to one or more embodiments shown and described herein.

Reference will now be made in detail to embodiments of a mode coupling connector system for facilitating mode coupling between multimode multicore optical fibers, examples of which are illustrated in the accompanying drawings. The mode coupling connector system includes a first fiber connector and a second fiber connector each coupled to a coupler housing. The first and second fiber connectors each include a casing and a ferrule housed in the casing. The ferrule includes a fiber receiving hole sized to receive a multimode multicore optical fiber. The mode coupling connector system also includes a mode coupling plate comprising a phase mask array positioned such that individual cores of a first multimode multicore optical fiber and a second multimode multicore optical fiber are in alignment with individual phase masks of the phase mask array. In operation, each phase mask alters (i.e., phase alters) light traversing between individual cores of the first and second multimode multicore optical fibers to achieve mode coupling between the propagation modes of this light. Repeated mode coupling mixes the propagation modes and reduces the differential mode delay of the propagation modes in the multicore optical fiber, allowing the use of multicore multimode optical fibers over long haul transmission systems (such as transoceanic transmission systems) without arduous computational requirements at the receiver of the transmission system, thereby increasing transmission capacity.

The mode coupling plate is positioned in the coupler housing, which offers several advantages when compared to previous methods and systems used to achieve mode coupling between multimode multicore optical fibers. Positioning the mode coupling plate in the coupler housing facilitates mode coupling without deforming or bending the multimode multicore optical fiber, which minimizes insertion loss. Minimizing insertion loss allows multiple mode coupling plates to be distributed along a long-haul transmission system without generating significant transmission losses. Furthermore, positioning the mode coupling plate in the coupler housing removes the need to print phase masks on the multicore optical fiber, reducing fiber processing steps and costs. Instead, the mode coupling plate can be produced at large scale in a single, repeatable process step and then cut into many pieces for use in multiple mode coupling connector systems, further reducing production costs. Moreover, the mode coupling plate can be easily changed in the field, for example, if damaged, particularly when compared to phase masks printed on directly on the end facets of an optical fiber. Embodiments of the mode coupling connector system will now be described and, whenever possible, the same reference numerals will be used throughout the drawings to refer to the same or like parts.

Figure 2:
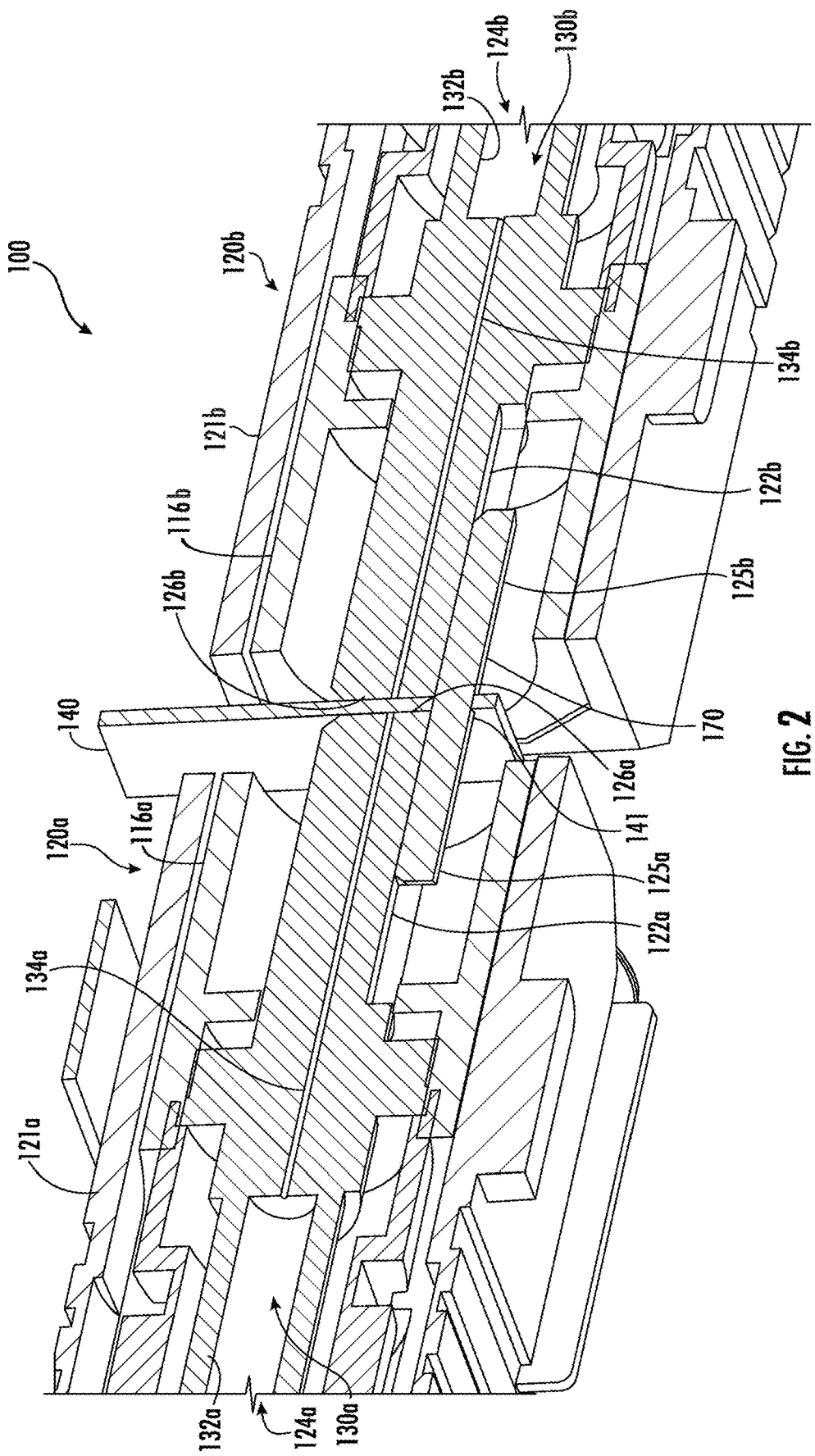
FIG. 2 schematically depicts a first fiber connector and a second fiber connector of an example mode coupling connector system, according to one or more embodiments shown and described herein.

Referring now to FIGS. 1 and 2, a mode coupling connector system 100 is schematically depicted. The mode coupling connector system 100 comprises a coupler housing 110 (FIG. 1), a first fiber connector 120a (FIG. 2), a second fiber connector 120b (FIG. 2), and a mode coupling plate 140 (FIGS. 1 and 2). The coupler housing 110 includes a first receiving cavity 112a for receiving the first fiber connector 120a and a second receiving cavity 112b for receiving the second fiber connector 120b. The first and second receiving cavities 112a, 112b of the coupler housing 110 each include one or more attachments mechanisms 114a, 114b, such as latching protrusions, and a ferrule sleeve 116a, 116b. While the embodiment of the first and second receiving cavities 112a. 112b depicted in FIG. 1 depict attachment mechanisms 114a, 114b that comprise latching protrusions, it should be understood that the attachment mechanisms 114a, 114b may comprise any attachment feature. The coupler housing 110 further comprises a plate receiving hole 111 extending into the coupler housing 110 between the first receiving cavity 112a and the second receiving cavity 112b and terminating at a location beyond the ferrule sleeves 116a. 116b of the first and second receiving cavities 112a. 112b. The plate receiving hole 111 is sized and configured to receive and house the mode coupling plate 140. The coupler housing 110 also includes a housing key hole 115 extending into the coupler housing 110 in an orientation non-parallel with the plate receiving hole 111 such that a locking feature, for example, a key 170, may be inserted into the housing key hole 115 and engage with a key notch 141 of the mode coupling plate 140 to lock the mode coupling plate 140 in the coupler housing 110. Key 170 may be any suitable key such as a feather key or the like.

Referring still to FIGS. 1 and 2, the first and second fiber connectors 120a, 120b each comprise a casing 121a, 121b and a ferrule 122a, 122b that is housed within the casing 121a, 121b. The ferrule 122a. 122b includes a fiber receiving hole 130a, 130b extending from an outer end 124a, 124b of the ferrule 122a, 122b to an inner end 126a. 126b of the ferrule 122a, 122b. The first fiber connector 120a is insertable into the first receiving cavity 112a of the coupler housing 110 and may be secured in the first receiving cavity 112a by the one or more attachment mechanisms 14a (e.g., one or more latching protrusions). The one or more attachment mechanisms 114a are engageable with the first fiber connector 120a, for example, with the casing 121a. In some embodiments, the casing 121a may also comprise one or more attachment mechanisms, for example, attachment mechanisms that complement the attachment mechanisms 114a of the first receiving cavity 112a. When the first fiber connector 120a is positioned in the first receiving cavity 112a, the ferrule 122a of the first fiber connector 120a extends into the ferrule sleeve 116a of the first fiber connector 120a. In addition, the second fiber connector 120b is insertable into the second receiving cavity 112b of the coupler housing 110 and may be secured in the second receiving cavity 112b by the one or more attachment mechanisms 114b (e.g., one or more latching protrusions). The one or more attachment mechanisms 114b are engageable with the second fiber connector 120b, for example, with the casing 121b. In some embodiments, the casing 121b may also comprise one or more attachment mechanisms, for example, attachment mechanisms that complement the attachment mechanisms 114b of the second receiving cavity 112b. The second fiber connector 120b is positioned in the second receiving cavity 112b, the ferrule 122b of the second fiber connector 120b extends into the ferrule sleeve 116b of the second fiber connector 120b.

Moreover, the first fiber connector 120a comprises a ferrule key hole 125a extending into the first fiber connector 120a (for example, extending into the ferrule 122a and, in some embodiments, extending into the casing 121a) and the second fiber connector 120b comprises a ferrule key hole 125b extending into the second fiber connector 120b (for example, extending into the ferrule 122b and, in some embodiments, extending into the casing 121b). As shown in FIG. 2, the ferrule key holes 125a, 125b are positioned at the inner ends 126a, 126b of the ferrules 122a, 122b and, when the first and second fiber connectors 120a, 120b are positioned in the first and second receiving cavities 112a, 112b, respectively, the ferrule key holes 125a, 125b are collectively aligned with the housing key hole 115 such that the key 170 may be inserted into the housing key hole 115 and the ferrule key holes 125a, 125b to engage the key notch 141 of the mode coupling plate 140.

Figure 3A:
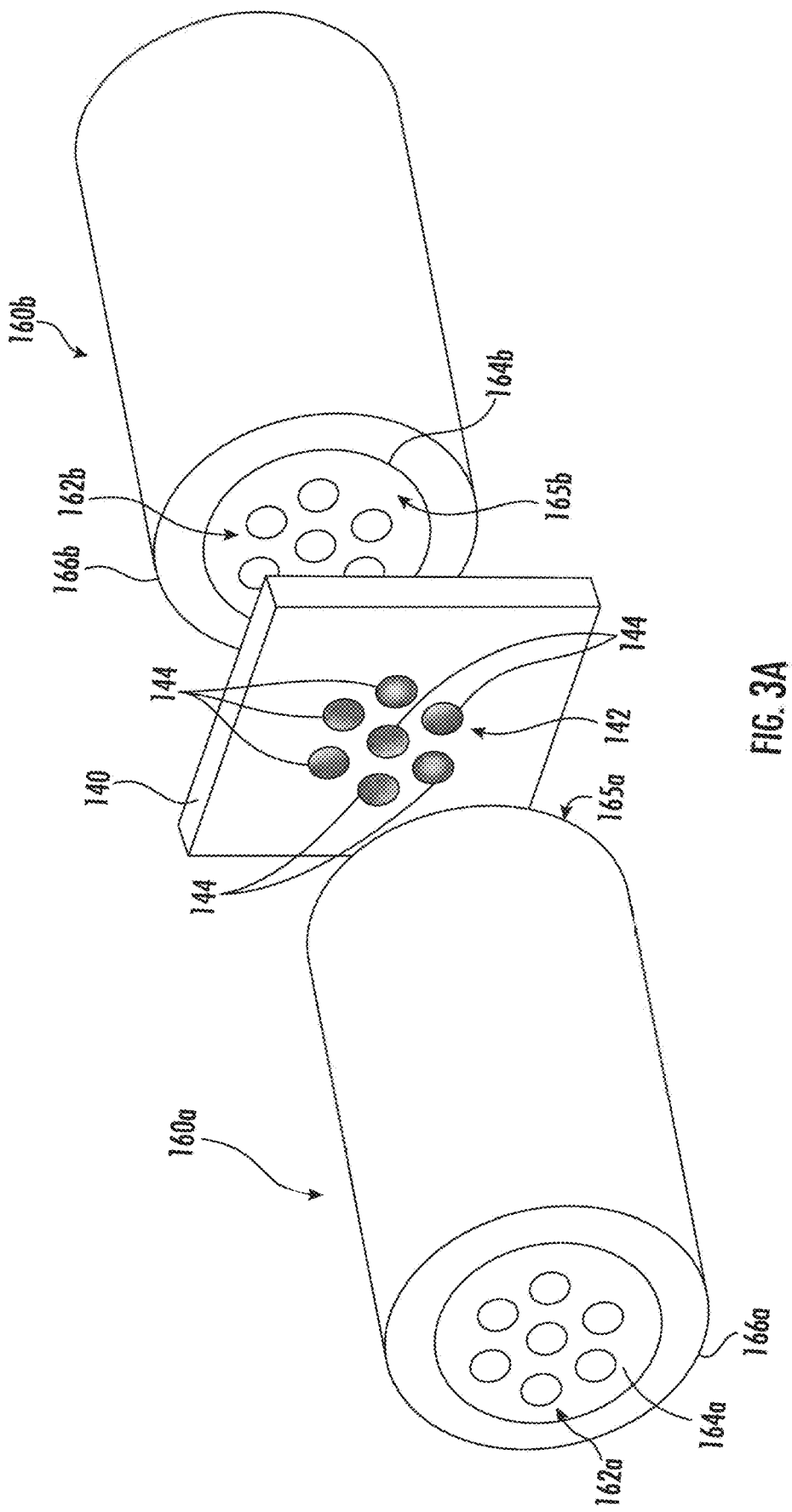
FIG. 3A schematically depicts a mode coupling plate positioned between a first multimode multicore optical fiber and a second multimode multicore optical fiber, according to one or more embodiments shown and described herein.

In operation, the first fiber connector 120a and the second fiber connector 120b are configured to receive and optically couple two optical fibers, such as first and second multimode multicore optical fibers 160a, 160b (FIG. 3A). For example, the fiber receiving hole 130a, 130b includes a jacket receiving portion 132a, 132b and a cladding receiving portion 134a, 134b. The jacket receiving portion 132a, 132b extends from the outer end 124a, 124b of the ferrule 122a, 122b to the cladding receiving portion 134a, 134b. The cladding receiving portion 134a, 134b extends from the jacket receiving portion 132a, 132b to the inner end 126a, 126b of the ferrule 122a, 122b. Further, the diameter of the jacket receiving portion 132a, 132b is greater than the diameter of the cladding receiving portion 134a, 134b. For example, the cladding receiving portion 134a, 134b is sized to receive a stripped end segment of an optical fiber in which the jacket of the optical fiber is removed, exposing the cladding (such as a stripped end segment of the first or second multimode multicore optical fiber 160a, 160b (FIG. 3A)). Further, the jacket receiving portion 132a. 132b is sized to receive a jacketed portion of an optical fiber adjacent the stripped end segment (such as a jacketed portion of the first or second multimode multicore optical fiber 160a, 160b (FIG. 3A)).

When the first and second fiber connectors 120a, 120b are coupled to the first and second receiving cavities 112a, 112b of the coupler housing 110, respectively, the fiber receiving holes 130a, 130b of ferrules 122a. 122b of the first and second fiber connectors 120a, 120b are in alignment. Thus, when the first multimode multicore optical fiber 160a (FIG. 3A) is positioned in the fiber receiving hole 130a of the first fiber connector 120a and the second multimode multicore optical fiber 160b (FIG. 3A) is positioned in the fiber receiving hole 130b of the second fiber connector 120b, the end facets 165a, 165b of the first and second multimode multicore optical fibers 160a, 160b are in alignment and the cores 162a, 162b of the first and second multimode multicore optical fibers 160a, 160b are optically coupled. As used herein. "optically coupled" refers to two or more optical components arranged such that photons may be transferred therebetween.

Referring now to FIG. 3A, the first multimode multicore optical fiber 160a and the second multimode multicore optical fiber 160b are schematically depicted with the mode coupling plate 140 positioned therebetween. Each multimode multicore optical fiber 160a, 160b comprises a plurality of cores 162a, 162b and a cladding 164a, 164b surrounding the plurality of cores 162a. 162b. The plurality of cores 162a, 162b and the cladding 164a, 164b each comprise a glass, plastic, or other transparent material and the plurality of cores 162 comprises a higher refractive index than the cladding 164a, 164b. The first multimode multicore optical fiber 160a and the second multimode multicore optical fiber 160b may also comprise a fiber jacket 166, 166b surrounding the cladding 164a, 164b. The fiber jacket 166a, 166b may comprise a polymer material, such as acrylate, epoxy, or the like.

Figure 3B:
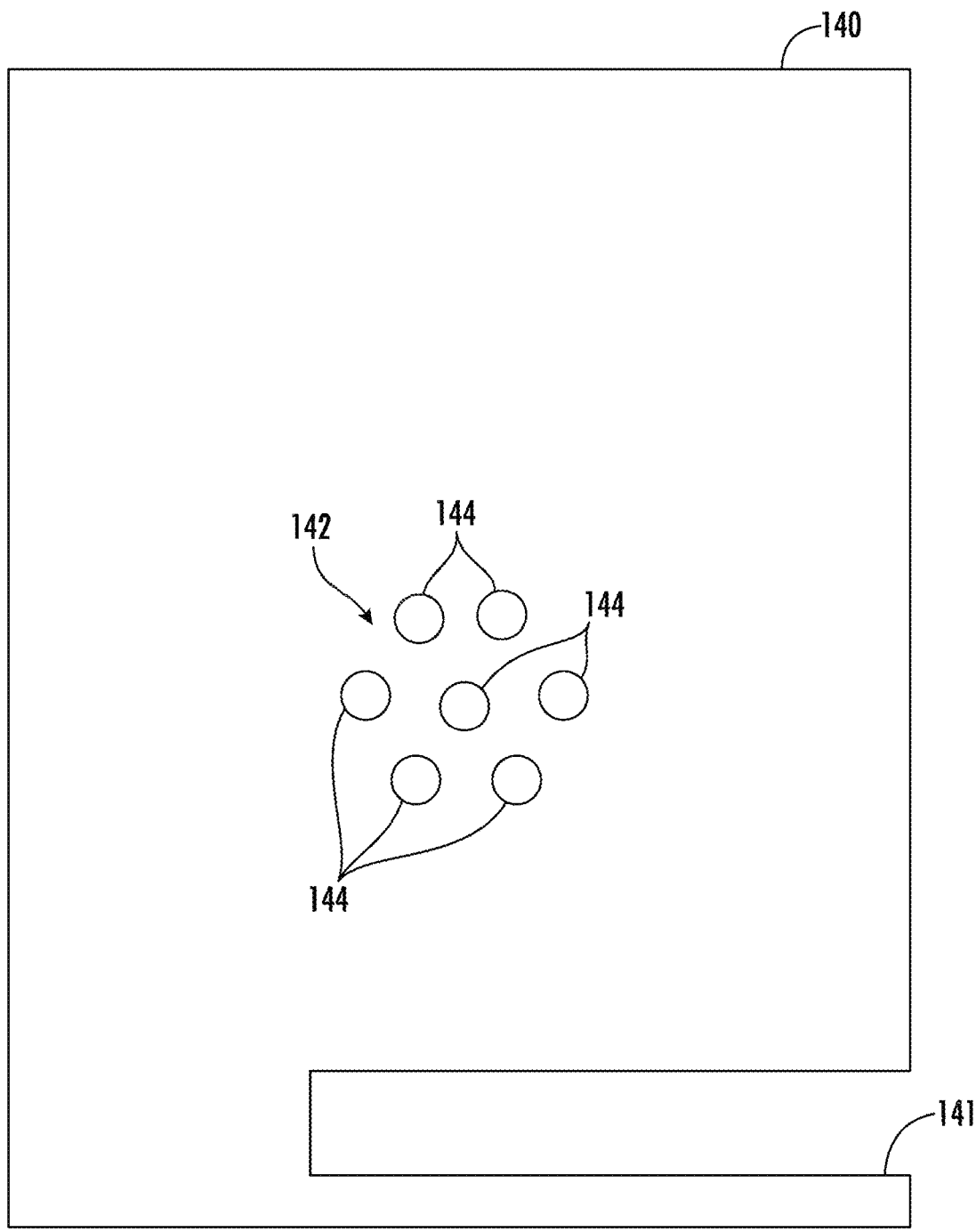
FIG. 3B schematically depicts a front view of an example mode coupling plate, according to one or more embodiments shown and described herein.

Referring now to FIGS. 1-3B, the mode coupling plate 140 is positioned between the first fiber connector 120a and the second fiber connector 120b such that at least two of the phase masks 144 of phase mask array 142 and, in some embodiments, all the phase masks 144 of the phase mask array 142, are circumscribed by the fiber receiving hole 130a, 130b of both the first and second fiber connector 120a, 120b when the fiber receiving hole of the first and second fiber connector 120a, 120b are in axial alignment. The alignment of the mode coupling plate 140 in the coupler housing 110 may be maintained by engaging the mode coupling plate 140 with a locking feature, such as a key 170. As shown in FIGS. 1, 2, and 3B, the mode coupling plate 140 further comprises a key notch 141 extending into the mode coupling plate 140 and sized to engage with the key 170. Further, the key notch 141 is located away from the phase mask array 142 so that the key 170 does not disrupt the optical function of the mode coupling plate 140. In some embodiments, the key 170 may be engaged with the key notch 141 of the mode coupling plate 140 using an adhesive, such as an optical adhesive, a non-optical adhesive, or a combination thereof, such a primary optical adhesive and a secondary non-optical adhesive optimized to provide mechanical strain relief. Example adhesives include EPO-TEK® HYB-353ND-LV, NTT AT6001, and NTT GH700H.

When the first and second multimode multicore optical fibers 160a, 160b are positioned in the fiber receiving holes 130a. 130b of the first and second fiber connectors 120a, 120b, respectively, the end facets 165a, 165b may be in axial alignment and individual cores 162 of each multimode multicore optical fiber 160a, 160b may be optically coupled one another and, in some embodiments, in axial alignment. In addition, as shown in FIG. 3A, the phase mask array 142 of the mode coupling plate 140 may be aligned with the first and second multimode multicore optical fibers 160a, 160b, such that individual phase masks 144 are positioned between and optically coupled to individual cores 162a, 162 of the first and second multimode multicore optical fibers 160a, 160b.

In operation, each phase mask 144 of the phase mask array 142 phase alters light traversing between individual cores 162, 162b of the first and second multimode multicore optical fibers 160a, 160b to induce mode coupling between the propagation modes of this light. In particular, each phase mask 114 induces a non-uniform phase change to the light. While not intending to be limited by theory, mode coupling occurs when external perturbation or fabrication variations change locally or perturb the propagating modes. The non-uniform phase changes induced by the phase masks 144 of the phase mask array 142 provides such a perturbation. Repeated mode coupling mixes the propagation modes and reduces differential mode delay. While still not intending to be limited by theory, propagation modes within a multimode optical fiber travel at different velocities. Thus, when mode coupling is weak or non-existent between the propagation modes, the temporal spread of the signal (i.e., the differential group delay is proportional to the difference between the fastest and slowest group velocities (i.e., the fastest propagation mode and the slowest propagation mode) and proportional to the fiber length. This leads to a linear increase in differential group delay with fiber length. However, with strong mode coupling, such as the mode coupling induced by the phase mask array 142 of the mode coupling plate 140, the modes intermix often, leading to frequent energy exchange between the faster and slower propagation modes. Statistically, this leads to the differential group delay growing sub-linearly, which is useful for managing the receiver complexity when implementing mode division multiplexing over multimode multicore optical fiber using a MIMO digital signaling processing unit.

Without intending to be limited by theory, strong mode coupling occurs in a multimode multicore optical fiber when the fiber bandwidth length product of the multimode multicore optical fiber is equal to the product of the bandwidth of the multimode multicore optical fiber and the square root of the length of the multimode multicore optical fiber (i.e., BW×Sqrt(L)). Without intending to be limited by theory, no mode coupling occurs in a multimode multicore optical fiber when the fiber bandwidth length product of the multimode multicore optical fiber is equal to the product of the bandwidth of the multimode multicore optical fiber and the length of the multimode multicore optical fiber (i.e., BW× (L)). While still not intending to be limited by theory, weak mode coupling occurs in a multimode multicore optical fiber when the fiber bandwidth length product of the multimode multicore optical fiber is between to the product of the bandwidth of the multimode multicore optical fiber and the square root of the length of the multimode multicore optical fiber and the product of the bandwidth of the multimode multicore optical fiber and the length of the multimode multicore optical fiber.

Figure 4:
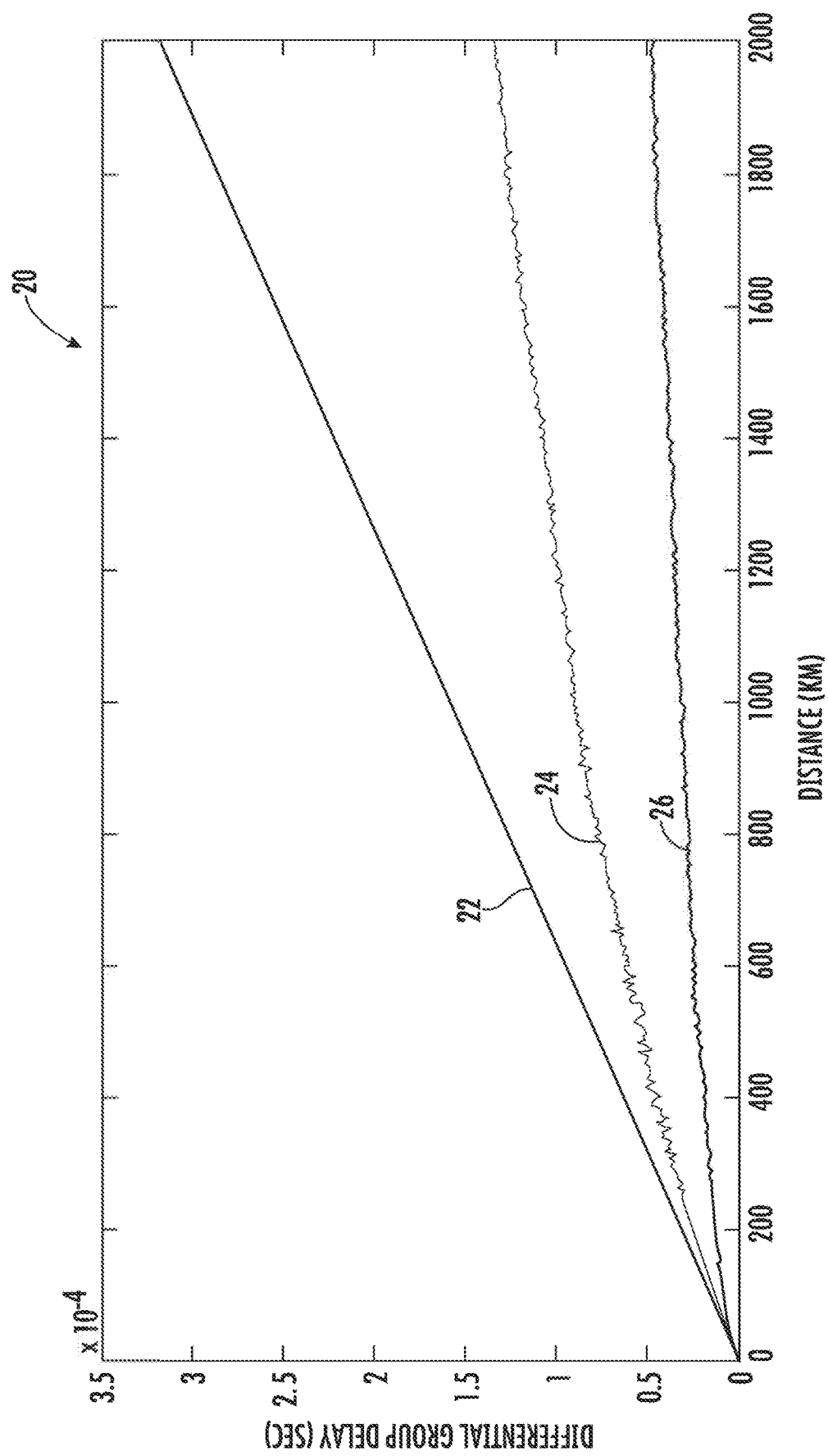
FIG. 4 graphically depicts differential group delay spread as a function of distance for example multimode multicore optical fibers having different levels of mode coupling, according to one or more embodiments shown and described herein.

Referring now to FIG. 4, graph 20 shows the effect of mode coupling on differential group delay. In particular, graph 20 depicts differential group delay as a function of propagation distance for example multimode multicore optical fibers having different levels of mode coupling. In particular, graph 20 shows the increase differential group delay as the distance that the light travels increases. For example, line 22 depicts differential group delay spread of propagation modes in an example multimode multicore optical fiber with no mode coupling, line 24 depicts differential group delay of propagation modes in an example multimode multicore optical fiber with weak mode coupling, and line 26 depicts differential group delay of propagation modes in an example multimode multicore optical fiber with strong mode coupling. As shown by lines 22-26, increasing mode coupling decreased differential group delay and, without mode coupling, long-haul optical communications have a large differential group delay when received and require complex computations to unravel the communication.

Figure 5:
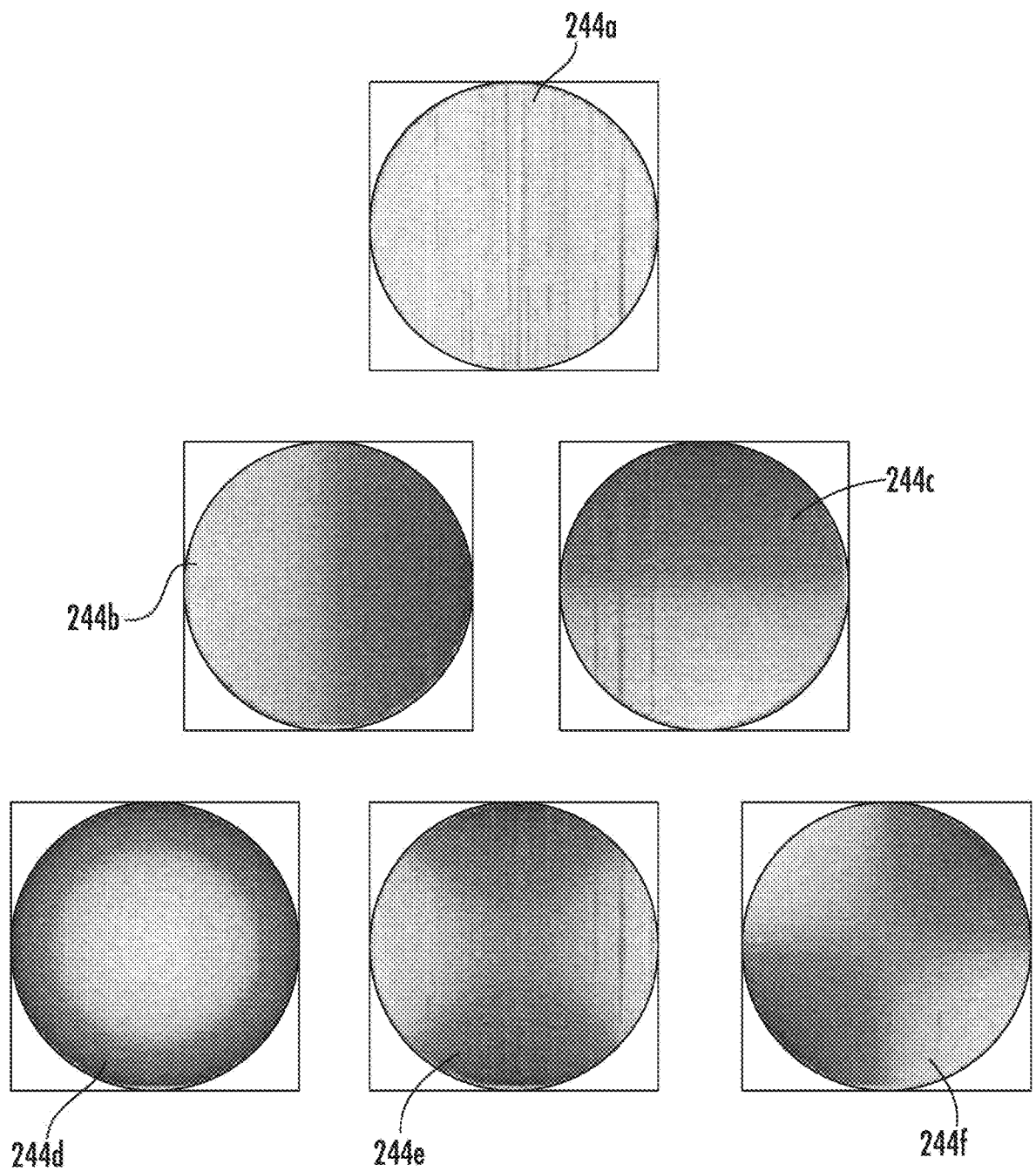
FIG. 5 schematically depicts example phase masks for use in a mode coupling plate, according to one or more embodiments shown and described herein.

Referring now to FIG. 5 example phase masks 244a-244f are schematically depicted. The example phase masks 244a-244f show some of the different types of phase masks that may be part of the phase mask array 142 of the mode coupling plate 140. In particular, the example phase masks 244a-244f are designed to correspond with the phase distribution of the first six Zernike polynomials and are configured to phase alter light propagating in one of the first six propagating modes and induce mode mixing between these propagation modes. Without intending to be limited by theory, Zernike polynomials are orthogonal polynomials spanning the space of unit disk, originally used to define aberrations in spherical lenses. In some embodiments, the phase mask array 142 comprises at least two phase masks 144 that correspond with different Zernike polynomials. For example, in some embodiments, the phase mask array 142 comprises at least six phase masks 144 such that at least one phase mask 144 of the phase mask array 142 corresponds with the phase distribution of each of the first six Zernike polynomials.

Referring still to FIG. 5, the first phase mask 244a corresponds with the fundamental propagation mode. The second phase mask 244b corresponds with the second propagation mode and, in operation, induces tilt in an X-direction (where a "Z-direction" is the propagation direction of light traversing the phase mask). The third phase mask 244c corresponds with the third propagation mode and, in operation, induces tilt in a Y-direction. The fourth phase mask 244d corresponds with the fourth propagation mode and, in operation, induces a defocusing effect. The fifth phase mask 244e corresponds with the fifth propagation mode and, in operation induces a 0° astigmatic effect. Further, the sixth phase mask 244f corresponds with the sixth propagation mode and induces a 450 astigmatic effect. It should be understood that the phase masks 244a-244f of FIG. 5 show a non-exhaustive set of example phase masks that may be arranged in any arrangement in the phase mask array 142 of the mode coupling plate 140. For example, when using multimode multicore optical fibers that support higher order propagation modes, phase masks that correspond with higher order Zernike polynomials may be used.

In view of the foregoing description, it should be understood that the mode coupling connector system described herein facilitates mode coupling between multimode multicore optical fibers to minimize differential mode delay of the propagation modes in the multicore optical fiber, improving the efficiency of multicore multimode optical fibers used long haul transmission systems, which increase the transmission capacity of these communications systems. In particular, it should be understood that the mode coupling connector system described herein includes a first fiber connector and a second fiber connector each coupled to a coupler housing. The first and second fiber connectors each include a casing and a ferrule housed in the casing. The ferrule includes a fiber receiving hole sized to receive a multimode multicore optical fiber. The mode coupling connector system also includes a mode coupling plate comprising a phase mask array positioned such that individual cores of a first multimode multicore optical fiber and a second multimode multicore optical fiber are in alignment with individual phase masks of the phase mask array such that the individual phase masks increase mode coupling between the propagation modes that travers the phase mask array.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising.

What is claimed is:

1. A mode coupling connector system comprising:
a first fiber connector comprising a first ferrule having a first fiber receiving hole;
a second fiber connector comprising a second ferrule having a second fiber receiving hole, wherein
the first fiber connector and the second fiber connector are coupled to a coupler housing; the first fiber connector is positioned in a first receiving cavity of the coupler housing and the second fiber connector is positioned in a second receiving cavity of the coupler housing;
the first fiber receiving hole extends from an outer end of the first ferrule to an inner end of the first ferrule;
the second fiber receiving hole extends from an outer end of the second ferrule to an inner end of the second ferrule; the first fiber receiving hole and the second fiber receiving hole are in axial alignment; and
a mode coupling plate comprising a phase mask array of a plurality of phase masks, wherein the mode coupling plate is positioned in a plate receiving hole of the coupler housing between the first receiving cavity and the second receiving cavity and at least two phase masks of the phase mask array are circumscribed by the fiber receiving hole of both the first fiber connector and the second fiber connector.

2. The mode coupling connector system of claim 1, wherein each phase mask of the phase mask array is circumscribed by the first fiber receiving hole of the first fiber connector and the second fiber receiving hole of the second fiber connector.

3. The mode coupling connector system of claim 1, wherein the phase mask array comprises at least two phase masks that correspond with different Zernike polynomials.

4. The mode coupling connector system of claim 3, wherein the phase mask array comprises at least six phase masks such that at least one phase mask of the phase mask array corresponds with the phase distribution of each of the first six Zernike polynomials.

5. The mode coupling connector system of claim 1, further comprising a key positioned in a housing key hole of the coupler housing and engaged with the mode coupling plate.

6. The mode coupling connector system of claim 5, wherein the housing key hole extends into the coupler housing in an orientation non-parallel with the plate receiving hole.

7. The mode coupling connector system of claim 5, wherein the mode coupling plate further comprises a key notch and the key is engaged with the key notch.

8. The mode coupling connector system of claim 1, wherein the first receiving cavity and the second receiving cavity each comprise one or more latching protrusions engaged with the first fiber connector and the second fiber connector, respectively.

9. The mode coupling connector system of claim 1, wherein the first fiber connector and the second fiber connector further comprise a casing, wherein the ferrule of the first fiber connector is positioned in the casing of the first fiber connector and the ferrule of the second fiber connector is positioned in the casing of the second fiber connector.

10. The mode coupling connector system of claim 1, wherein:
the first fiber receiving hole and second fiber receiving hole both comprise a jacket receiving portion and a cladding receiving portion;
the respective jacket receiving portions of the first fiber receiving hole and the second fiber receiving hole extend from the outer end of the respective first ferrule and second ferrule to the respective cladding receiving portion;
the respective cladding receiving portion extends from the inner end of the respective first ferrule and second ferrule to the respective jacket receiving portion; and
a diameter of each of the respective jacket receiving portions is greater than a diameter of the respective cladding receiving portions.

11. A mode coupling connector system comprising:
a first fiber connector and a second fiber connector each coupled to a coupler housing, wherein the first fiber connector is positioned in a first receiving cavity of the coupler housing, the second fiber connector is positioned in a second receiving cavity of the coupler housing, and the first fiber connector and the second fiber connector each comprise a ferrule;

a first multimode multicore optical fiber positioned in the ferrule of the first fiber connector and a second multimode multicore optical fiber positioned in the ferrule of the second fiber connector such that an end facet of the first multimode multicore optical fiber is in axial alignment with an end facet of the second multimode multicore optical fiber; and a mode coupling plate comprising a phase mask array of a plurality of phase masks, wherein the mode coupling plate is positioned in a plate receiving hole of the coupler housing between the first receiving cavity and the second receiving cavity and at least two phase masks of the phase mask array are positioned between and aligned with individual cores of the first multimode multicore optical fiber and the second multimode multicore optical fiber.

12. The mode coupling connector system of claim 11, wherein each phase mask of the phase mask array is positioned between and aligned with individual cores of the first multimode multicore optical fiber and the second multimode multicore optical fiber.

13. The mode coupling connector system of claim 11, wherein the phase mask array comprises at least two phase masks that correspond with different Zernike polynomials.

14. The mode coupling connector system of claim 13, wherein the phase mask array comprises at least six phase masks such that at least one phase mask of the phase mask array corresponds with the phase distribution of each of the first six Zernike polynomials.

15. The mode coupling connector system of claim 11, further comprising a key positioned in a housing key hole of the coupler housing and engaged with the mode coupling plate.

16. The mode coupling connector system of claim 15, wherein the housing key hole extends into the coupler housing in an orientation non-parallel with the plate receiving hole.

17. The mode coupling connector system of claim 15, wherein the mode coupling plate further comprises a key notch and the key is engaged with the key notch.

18. The mode coupling connector system of claim 11, wherein the first receiving cavity and the second receiving cavity each comprise one or more latching protrusions engaged with the first fiber connector and the second fiber connector, respectively.

19. The mode coupling connector system of claim 11, wherein the first fiber connector and the second fiber connector further comprise a casing, wherein the ferrule of the first fiber connector is positioned in the casing of the first fiber connector and the ferrule of the second fiber connector is positioned in the casing of the second fiber connector.

20. The mode coupling connector system of claim 11, wherein:

the ferrule of both the first fiber connector and the second fiber connector comprises a fiber receiving hole having a jacket receiving portion and a cladding receiving portion;

the jacket receiving portion extends from an outer end of the ferrule to the cladding receiving portion, the cladding receiving portion extends from an inner end of the ferrule to the jacket receiving portion, and a diameter of the jacket receiving portion is greater than a diameter of the cladding receiving portion;

the first multimode multicore optical fiber comprises a stripped end portion positioned in the cladding receiving portion of the fiber receiving hole of the ferrule of the first fiber connector; and the second multimode multicore optical fiber comprises a stripped end portion positioned in the cladding receiving portion of the fiber receiving hole of the ferrule of the second fiber connector.

21. A mode coupling connector system comprising:

a coupler housing comprising a first receiving cavity and a second receiving cavity;

a mode coupling plate positioned in a plate receiving hole of the coupler housing between the first receiving cavity and the second receiving cavity, wherein the mode coupling plate comprising a key notch and a phase mask array comprising a plurality of phase masks; and a key positioned in a housing key hole of the coupler housing and engaged with the key notch of the mode coupling plate.

22. The mode coupling connector system of claim 21, wherein the housing key hole extends into the coupler housing in an orientation non-parallel with the plate receiving hole.

23. The mode coupling connector system of claim 21, further comprising a first fiber connector positioned in the first receiving cavity of the coupler housing and a second fiber connector is positioned in the second receiving cavity of the coupler housing, wherein the first fiber connector and the second fiber connector each comprise a ferrule with a fiber receiving hole extending from an outer end of the ferrule to an inner end of the ferrule; and at least two phase masks of the phase mask array of the mode coupling plate are circumscribed by the fiber receiving hole of both the first fiber connector and the second fiber connector.

24. The mode coupling connector system of claim 23, wherein:

the first fiber connector and the second fiber connector further comprise a casing;

the ferrule of the first fiber connector is positioned in the casing of the first fiber connector and the ferrule of the second fiber connector is positioned in the casing of the second fiber connector; and the first receiving cavity and the second receiving cavity each comprise one or more latching protrusions engaged with the casing of the first fiber connector and the casing of the second fiber connector, respectively.

* * * * *

UNITED STATES PATENT AND TRADEMARK OFFICE
CERTIFICATE OF CORRECTION

PATENT NO. : 11,054,584 B2
APPLICATION NO. : 16/686882
DATED : July 6, 2021
INVENTOR(S) : Adrian Alejando Juarez Marroquin et al.

Page 1 of 1

It is certified that error appears in the above-identified patent and that said Letters Patent is hereby corrected as shown below:

On the Title Page

On Page 2, in Column 1, item (56), Other Publications, Line 2, delete "Confress," and insert
-- Congress, --.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*